(12) United States Patent
Kim

(10) Patent No.: US 6,317,425 B1
(45) Date of Patent: Nov. 13, 2001

(54) DATA SYNCHRONIZING METHOD FOR RADIO MULTI-TERMINAL COMMUNICATIONS SYSTEM

(75) Inventor: Hae-Sug Kim, Kyonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/119,538

(22) Filed: Jul. 20, 1998

(30) Foreign Application Priority Data

Jul. 18, 1997 (KR) .................................................. 97-33494

(51) Int. Cl.[7] ...................................................... H04J 3/06
(52) U.S. Cl. .......................... 370/350; 370/510; 370/511; 370/512
(58) Field of Search ..................................... 370/310, 350, 370/355, 356, 506, 503, 509, 510, 512, 511, 328, 338; 455/502, 76

(56) References Cited

U.S. PATENT DOCUMENTS 5,913,171 * 6/1999 Solonen et al. ....................... 455/502
5,940,390 * 8/1999 Berl et al. ............................. 370/389

* cited by examiner

*Primary Examiner*—Wellington Chin
*Assistant Examiner*—Brenda H. Pham
(74) *Attorney, Agent, or Firm*—Dilworth & Barrese, LLP

(57) ABSTRACT

A data synchronizing method for a radio multi-terminal communications system including a cellular telephone and a PDA (Personal Data Assistant). Messages transmitted between the cellular telephone and the PDA are prioritized. The cellular telephone and the PDA interchange the message data according to the set priority order, thereby sharing the data with reduced data processing time. A radio multi-terminal communications system is also included which uses prioritized messages for sharing data.

17 Claims, 4 Drawing Sheets

| PRIORITY TYPE | MESSAGE TYPE | COMMAND TYPE | LENGTH | DATA |

FIG. 2

DATA SYNCHRONIZING METHOD FOR RADIO MULTI-TERMINAL COMMUNICATIONS SYSTEM

BACKGROUND OF THE INVENTION

1. Field of the Invention

The present invention relates to a method for interfacing between a cellular telephone and a personal data assistant (PDA) in a radio multi-terminal communications system, and in particular, to a data synchronizing method and system for allowing a cellular telephone and a PDA to share data.

2. Description of the Related Art

FIG. 1 shows a block diagram of a radio multi-terminal communications system which is divided into a cellular telephone 200, being a first communication terminal, and a personal data assistant (hereinafter called PDA) 100, being a second communication terminal.

First, as for the cellular telephone 200, a second CPU (Central Processing Unit) 211 controls the overall operations of the cellular telephone 200 and communicates with a first CPU 111 in the PDA 100. A program memory 212, being a flash memory, stores a control program of the second CPU 211. A data memory 213, being a RAM (Random Access Memory), temporarily stores data generated during operations of the cellular telephone 200. A nonvolatile memory 214, being an EEPROM (Electrically Erasable and Programmable Read Only Memory), stores telephone numbers registered for abbreviated dialing (or speed dialing) and system parameters. A keypad 215 generates command key signals for controlling the second CPU 211 and key signals for inputting data. A display 216, under the control of the second CPU 211, displays state information generated during operations of the cellular telephone 200. An LCD (Liquid Crystal Display) may be used for the display 216.

In addition, the cellular telephone 200 includes a communication module including an RF (Radio Frequency) interface 217, a frequency converter 218, a MODEM (Modulator-Demodulator) 219, and a signal processor 220. The communication module is controlled by the second CPU 211. The signal processor 220 is composed of an interleaver and encoder, a deinterleaver and decoder, a vocoder, and a PCM CODEC (Pulse Code Modulation Coder-Decoder).

Here, it should be noted that the communication module is missing a transmission part and a reception part, omitted as a matter of convenience. Further, FIG. 1 is missing control signal lines for the second CPU 211, a voice signal processor, and a transceiver, also omitted as a matter of convenience.

During a transmission mode, the signal processor 220 encodes transmission data, and the MODEM 219 modulates the encoded transmission data. The frequency converter 218 up-converts the modulated transmission signal to a transmission frequency band, and the RF interface 217 filters the RF transmission signal output from the frequency converter 218 to pass the transmission band frequency signals only. Further, the RF interface 217 amplifies the transmission signals and radiates the amplified transmission signals to the air via an antenna.

During a reception mode, the RF interface 217 low-noise-amplifies the low power RF signals received via the antenna and filters them to pass the reception band frequency signals only. The frequency converter 218 down-converts the received RF signals to the baseband signal, and the MODEM 219 demodulates the output signals of the frequency converter 218.

Next, as for the PDA 100, the first CPU 111 controls the overall operations of the PDA 100 and communicates with the second CPU 211 in the cellular telephone 200. A program memory 112, being a flash memory, stores a control program of the first CPU 111. A data memory 113, being a RAM, temporarily stores data generated during operations of the PDA 100 under the control of the first CPU 111. A nonvolatile memory 114, being an EEPROM, stores information input by the user and information received from the cellular telephone 200. A keypad 115 generates command key signals for controlling the first CPU 111 and key signals for inputting data. A display 116, composed of an LCD, displays the status information generated during operations of the PDA 100 under the control of the first CPU 111. A communication module 117 forms a data communication channel between the PDA 100 and the cellular telephone 200 by way of an UART (Universal Asynchronous Receiver Transmitter) 150.

For instance, the cellular telephone 200 may be a CDMA (Code Division Multiple Access) terminal and the PDA 100 may be a hand-held computer such as a notebook computer.

As illustrated in FIG. 1, in the radio multi-terminal communications system, the first CPU 111 in the PDA 100 asynchronously communicates with the second CPU 211 in the cellular telephone 200 by way of the UART 150. Here, the message transmitted therebetween has an HDLC (High-level Data Link Control) format and a transfer rate of 57.6 Kbps. The UART 150 is an asynchronous transceiver with serial-to-parallel and parallel-to-serial conversion functions, for transmitting data. With this combination, the PDA 100 can graphically process user interface data input from the cellular telephone 200.

As described, the radio multi-terminal communications system transmits data in the asynchronous simplified HDLC format in order to allow the cellular telephone 200 and the PDA 100 to share the data. Conventionally, upon occurrence of an event, the cellular telephone 200 and the PDA 100 interchange data to share it, thereby providing a real time service to the user. However, such a data communication method leads to a reduction in the operating time (or run-time) of a battery. To save the battery, the system may transmit the data upon request of the user. However, in such a case, the system cannot provide the real time service.

SUMMARY OF THE INVENTION

It is therefore an object of the present invention to provide a data synchronizing method for allowing a cellular telephone and a PDA in a radio multi-terminal communications system to share data.

It is another object of the present invention to provide a data synchronizing method for prioritizing data to be shared and processing the data according to a priority order.

To achieve the above objects, the present invention provides a data synchronizing method for a radio multi-terminal communications system including a cellular telephone and a PDA. In the method, the messages transmitted between the cellular telephone and the PDA are prioritized. The cellular telephone and the PDA interchange the message data according to the set priority order, thereby sharing the data with reduced data processing time.

Preferably, the message transmitted between the cellular telephone and the PDA has the format including a priority type and a command type. The priority type is divided into a first priority type assigned to a message to be shared immediately, a second priority type assigned to a message to be shared according to a user's decision, a third priority type assigned to a message to be shared according to the user's decision upon checking current states of the cellular telephone and the PDA. Further, the command type is divided into a request command responsive to which the PDA requests to the cellular telephone to transmit data to be shared, a response command responsive to which the cellular telephone transmits to the PDA a response to said request command, a set command responsive to which the PDA requests the cellular telephone to update the data, and an indication command responsive to which the cellular telephone requests the PDA to store the data.

A radio multi-terminal communications system, in accordance with the present invention, includes a first cellular device, and a second cellular device having a couplable interface therebetween, the couplable interface including a transceiver for transmitting and receiving two-way communications between the first cellular device and the second cellular device. The communications include prioritized messages and command types of the messages transmitted between the first cellular device and the second cellular device. The first cellular device and the second cellular device further include means for analyzing priority types and the command types of the messages and means for synchronizing data of the first cellular device with data of the second cellular device according to the priority types, so as to allow the first cellular device: and the second cellular device to share the data.

In alternate embodiments of the system, the transceiver preferably includes a universal asynchronous receiver transmitter (UART). The prioritized messages are preferably prioritized according to a priority type. The priority types include a first priority type assigned to a message to be shared immediately, a second priority type assigned to a message to be shared according to a user's decision, a third priority type assigned to a message to be shared according to the user's decision upon checking current states of the cellular devices. The command types may include a request command responsive to which the first cellular device requests the second cellular device to transmit data to be shared, a response command responsive to which the second cellular device transmits to the first cellular device a response to said request command, a set command responsive to which the first cellular device requests the second cellular device to update the data, and an indication command responsive to which the second cellular device requests the first cellular device to store the data. The prioritized messages and command types may be transmitted in a format, the format including a storage area for each of priority type information, command type information, message type information, length of the message information and data to be transmitted. The first cellular device and the second cellular device preferably include a PDA and a cellular telephone.

BRIEF DESCRIPTION OF THE DRAWINGS

The above and other objects, features and advantages of the present invention will become more apparent from the following detailed description when taken in conjunction with the accompanying drawings in which:

FIG. 2 is a diagram illustrating the format of a message transmitted between a cellular telephone (200) and a PDA (100) of FIG. 1 according to an embodiment of the present invention;

DETAILED DESCRIPTION OF PREFERRED EMBODIMENTS

Figure 1:
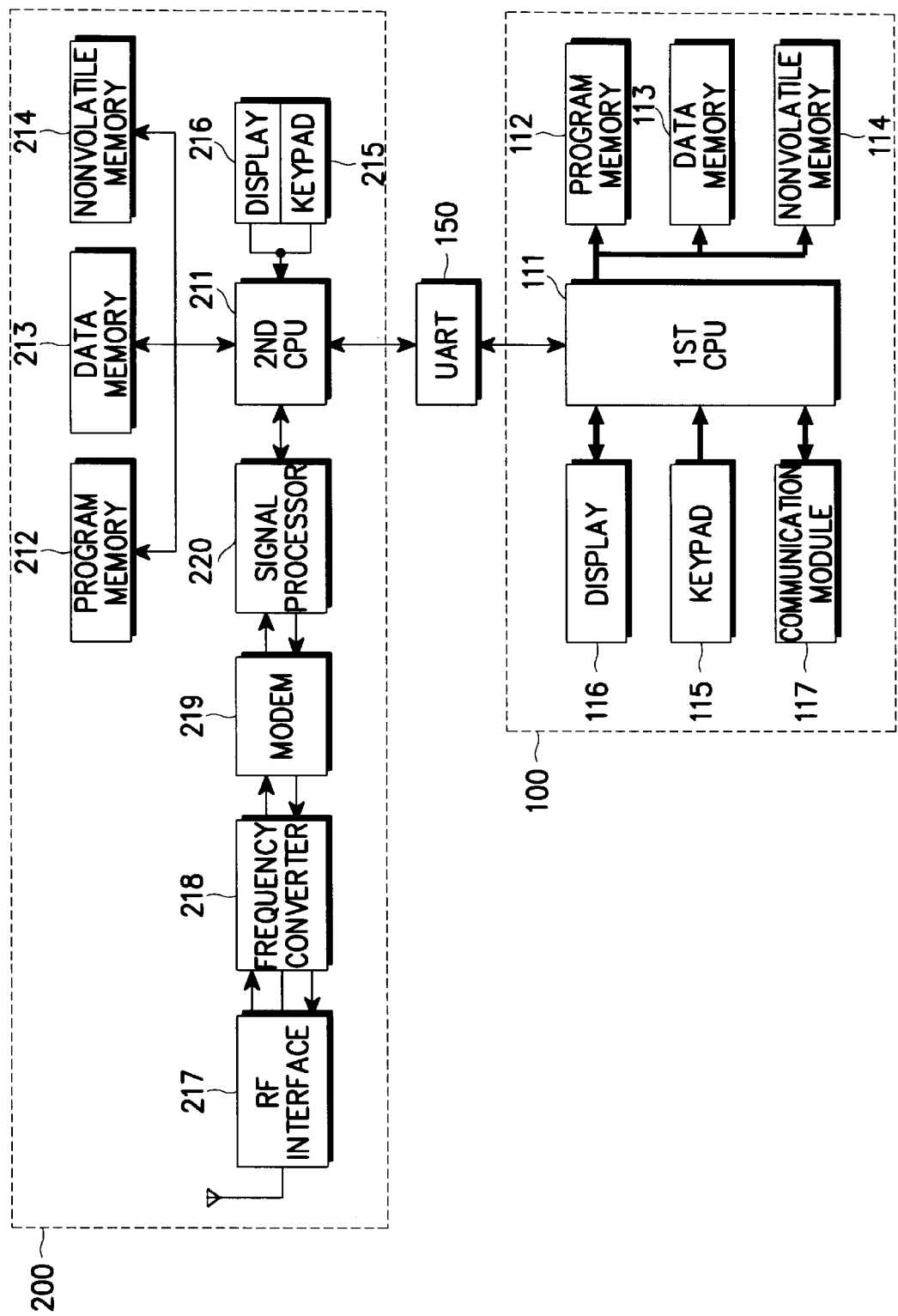
FIG. 1 is a block diagram of a radio multi-terminal communications system to which the present invention is applied.

An embodiment of the present invention will be applied to the radio multi-terminal communications system of FIG. 1. In this system, the cellular telephone 200 and the PDA 100 interchange messages and call service data. To that end, the system prioritizes the messages transmitted between the cellular telephone 200 and the PDA 100, and transmits the messages depending on a set priority order in a communication mode. For example, the priority order is set such that the messages to be shared in real time have higher priority while the messages not to be processed immediately have lower priority.

FIG. 2 shows a format of the messages transmitted between the cellular telephone 200 and the PDA 100 according to an embodiment of the present invention The message format includes a priority type for the message, a message type, a command type, a length of the message, and data. In one embodiment of the present invention, the priority type is divided into three types PR0, PR1 and/or PR2 according to urgency of the message. Additional priority types are also contemplated. Priority type may be assigned to different messages according to user selected priorities or set during the manufacture of the hardware.

In one priority type, PR0 is assigned to the message which should be immediately shared by the cellular telephone 200 and the PDA 100 upon occurrence of an event. That is, the message with the priority type PR0 is the message for an event which should be immediately notified to the user. For example, each time the event occurs, data stored in a redial buffer and a memory buffer of the PDA 100 should be updated so that it is identical to the data stored in a redial buffer and a memory buffer of the cellular telephone 200, thereby synchronizing the data of the PDA 100 with the data of the cellular telephone 200. In such a case, the cellular telephone 200 transmits the message immediately irrespective of the status of the PDA 100. A priority type PR1 is assigned to the message which is to be transmitted to the other communication terminal only when the user determines that it should be shared with the other communication terminal. For example, the message with the priority type PR1 may include configuration information for the radio multi-terminal communications system. A priority type PR2 is assigned to the message to be transmitted to the opposite communication terminal only when the user determines that the message should be shared, upon checking the current states of the communication terminals. For instance, the message with the priority type PR2 may include memory data that the PDA 100 requires upon activation.

Further, the command type includes a request command REQ_CMD, a response command RES_CMD, a set command SET_CMD, and an indication command IND_CMD. The PDA 100 transmits the request command REQ_CMD to the cellular telephone 200 when requesting the cellular telephone 200 to transmit the current status of the data to be shared, and the cellular telephone 200 transmits the response command RES_CMD to the PDA 100 when transmitting a response to the request command REQ_CMD. In addition, the PDA 100 transmits the set command SET_CMD to the cellular telephone 200 when requesting the cellular telephone 200 to update the data, and the cellular telephone 200 transmits the indication command IND_CMD to the PDA 100 when requesting the PDA to store the data.

Figure 3:
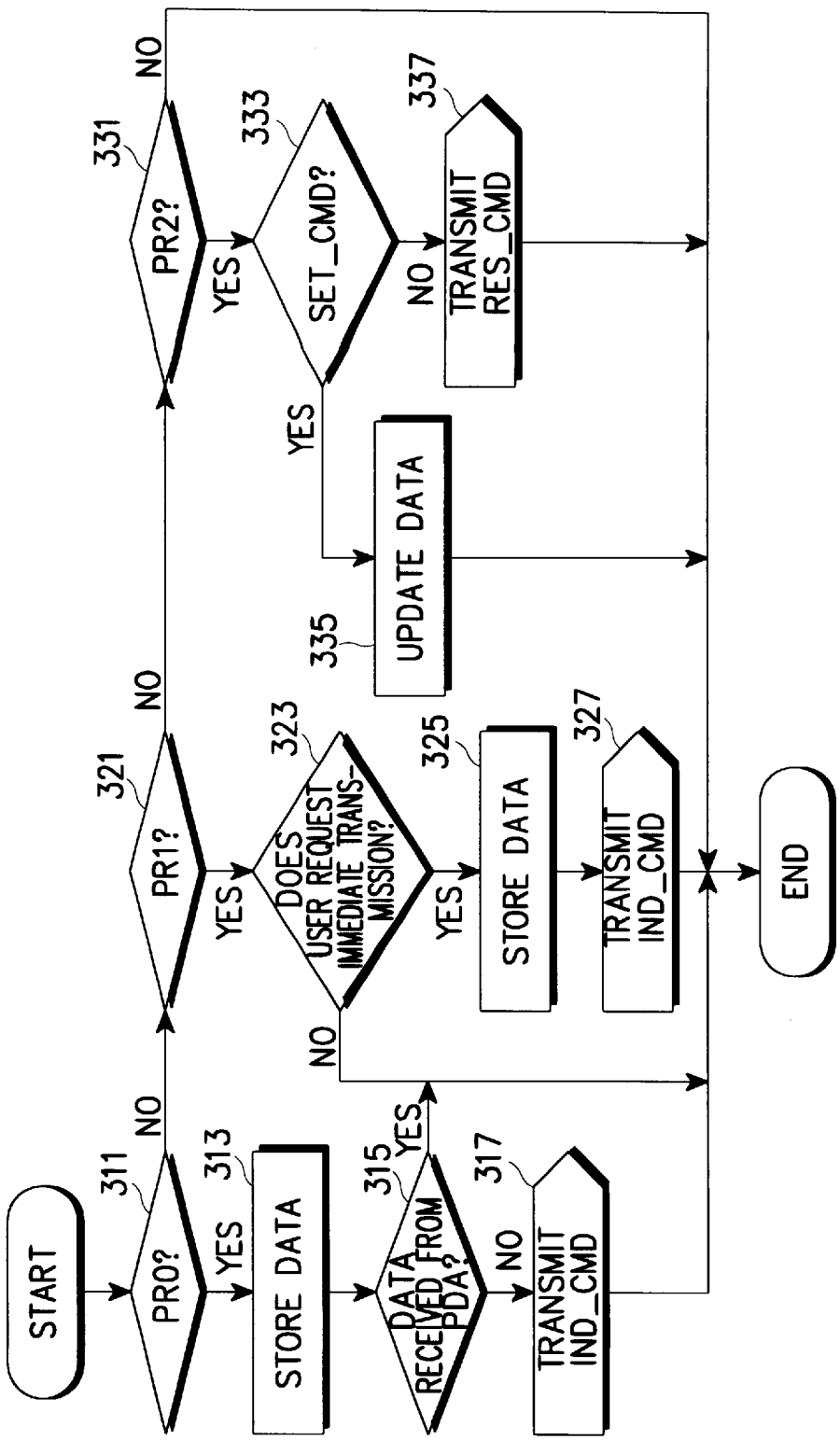
FIG. 3 is a flow chart of the cellular telephone illustrating a procedure for synchronizing data of the cellular telephone with data of the PDA according to an embodiment of the present invention.

FIG. 3 shows a flow chart of the cellular telephone 200 illustrating the procedure for synchronizing the data thereof with the data of the PDA 100 according to the present invention. Referring to FIG. 3, when the cellular telephone 200 has an event occurring therein or receives a message from the PDA 100, the second CPU 211 checks the priority type of the message through steps 311, 321, and 331. Specifically, the second CPU 211 determines in the step 311 whether the message has the priority type PR0. Here, if the message has data which should be immediately shared with the PDA 100, it is determined that the message has the priority type PR0. If the message has the priority type PR0, the second CPU 211 stores the data in a data storage area for the message in step 313. Then, the second CPU 211 determines in step 315 whether the stored data is received from the PDA 100. If so, the second CPU 211 terminates the procedure, thus sharing the data with the opposite communication terminal (i.e., the PDA 100). However, if the stored data is data for the event occurred in the cellular telephone 200, the second CPU 211 sets in step 317 the priority type to PR0 and the command type to the indication command IND_CMD and then, transmits them to the PDA 100 via the UART 150.

If the message type is not PR0 in the step 311, the second CPU 211 determines in step 321 whether the message has the message type PR1. If so, the second CPU 211 determines in step 323 whether the user has requested immediate transmission of the data. If not, the procedure is terminated. However, if the user has requested the immediate transmission of the data, the second CPU 211 stores the message data in step 325. Successively, the second CPU 211 sets in step 327 the priority type to PR1 and the command type to the indication command IND_CMD and then transmits them to the PDA 100 via the UART 150.

Further, if the priority type is not set to PR1 in the step 321, the second CPU 211 determines in step 331 whether the priority type is set to PR2. If the priority type is set to PR2, the second CPU 211 determines in step 333 whether the message type is set to the set command SET_CMD. If the message type is set to the set command SET_CMD, the second CPU 211 updates the received data in step 335. However, if the message type is not set to the set command SET_CMD, it is meant that the request command REQ_CMD is received from the PDA 100. Thus, the second CPU 211 sets in step 337 the priority type to PR2 and the command type to the response command RES_CMD and then transmits them to the PDA 100, to transmit the data requested by the PDA 100.

Figure 4:
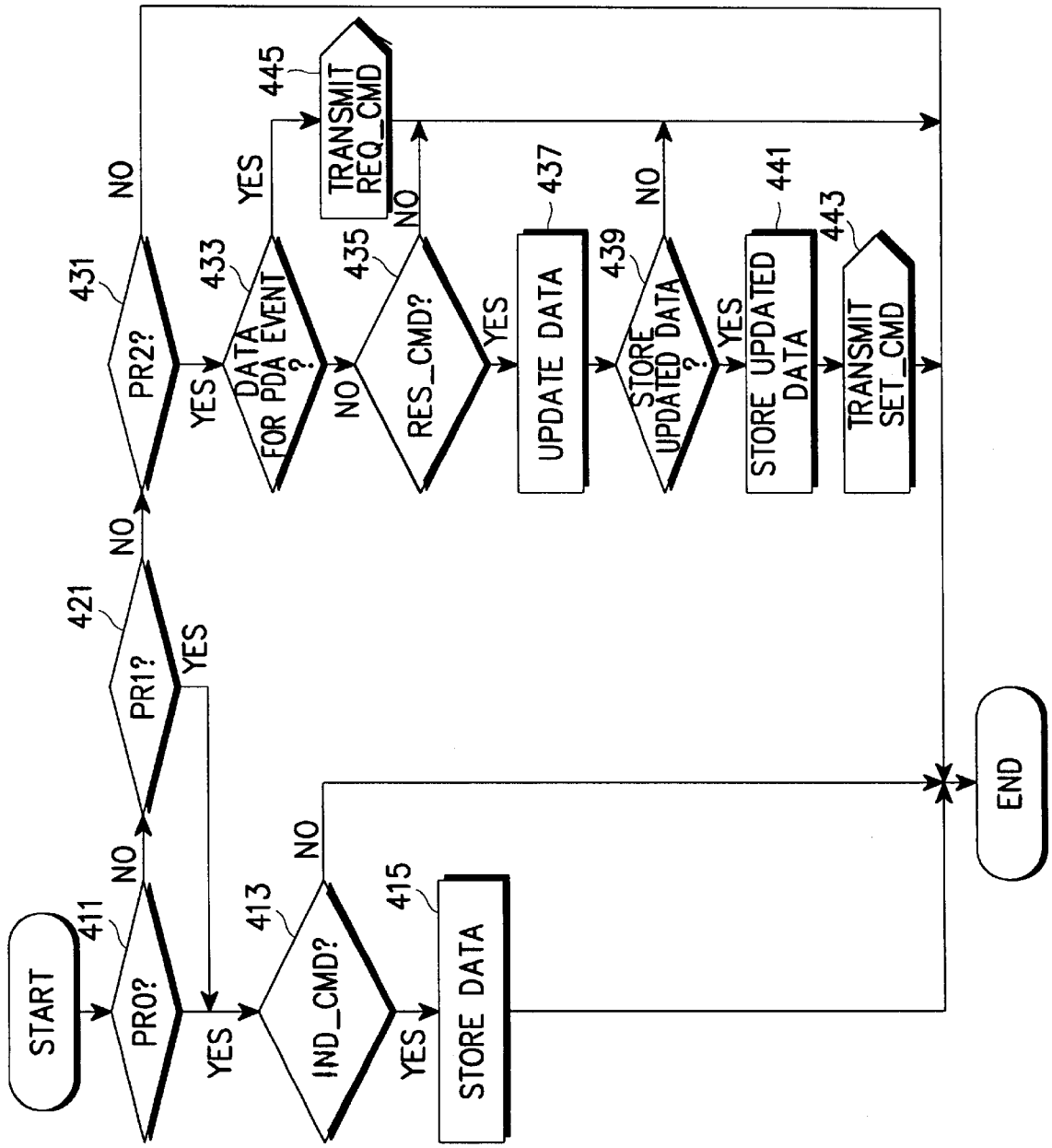
FIG. 4 is a flow chart of the PDA illustrating a procedure for synchronizing data of the PDA with data of the cellular telephone according to an embodiment of the present invention.

FIG. 4 shows a flow chart of the PDA 100 illustrating the procedure for synchronizing the data thereof with the data of the cellular telephone 200 according to the present invention. Referring to FIG. 4, when the PDA 100 has an event occurring therein or receives a message from the cellular telephone 200, the first CPU 111 of the PDA 100 performs steps 411, 421 and 431 to process the event or message according to the priority order. The first CPU 111 determines in step 411 whether the received message for the event occurred in the cellular telephone 200 has the priority type PR0. If so, the first CPU 111 examines in step 413 the received message to determine whether the command type is set to the indication command IND_CMD. If the command type is set to the indication command IND_CMD, the first CPU 111 stores the received data in the data storage area for the message in step 415 and then terminates the procedure. However, if the command type is not set to the indication command IND_CMD, the first CPU 111 terminates the procedure in order to share the data with the other communication terminal (i.e., the cellular telephone 200).

Further, if the priority type is not set to PR0 in the step 411, the first CPU 111 determines in step 421 whether the priority type is set to PR1. If so, the first CPU 111 proceeds to the step 413 to determine whether the command type is set to the indication command IND_CMD. If so, the first CPU 111 stores the received data in the step 415, judging that the user has requested the immediate transmission.

In addition, if the priority type is not set to PR1 in the step 421, the first CPU determines in step 431 whether the priority type is set to PR2. If so, the first CPU 111 determines in step 433 whether the message is for the event occurred in the PDA 100. If so, the first CPU 111 sets in step 445 the priority type to PR2 and the command type to the request command REQ_CMD and then transmits them to the cellular telephone 200.

However, if it is determined in the step 433 that the message was received from the cellular telephone 200, the first CPU 111 determines in step 435 whether the command type is set to the response command RES_CMD. If so, the first CPU 111 ends the procedure. However, if the command type is not set to the response command RES_CMD, the first CPU 111 updates the data and displays the updated data in step 437. If the user additionally updates the data at the sight of the displayed data, the first CPU 111 determines in step 439 whether to store the updated data. If it is not necessary to store the updated data, the first CPU 111 ends the procedure, maintaining the previous data. However, if it is necessary to store the updated data, the first CPU 111 stores the updated data in step 441. Thereafter, the first CPU 111 sets in step 443 the priority type to PR2 and the command type to the set command SET_CMD and then transmits them to the cellular telephone 200.

In summary, upon occurrence of the event with the priority type PR0, the cellular telephone 200 stores the corresponding message and instantly transmits it to the PDA 100 in order to share the message data with the PDA 100. Then, the PDA 100 stores the received data to maintain the same data as that of the cellular telephone 200. Further, when the message with the priority type PR1 was generated at the request of the user, the cellular telephone 200 stores the corresponding data and immediately transmits it to the PDA 100. Then, the PDA 100 stores the received message data to maintain the same data as that of the cellular telephone 200. However, when the message with the priority type PR1 was not requested by the user, the cellular telephone 200 terminates the procedure. When the message type is set to PR2 and the message is for the event occurring in the PDA 100, the PDA 100 transmits the request command REQ_CMD to the cellular telephone 200. Then, the cellular telephone 200 transmits the response command RES_CMD to the PDA 100. Moreover, upon receipt of the response command RES CMD from the cellular telephone 200, the PDA 100 updates the message data and transmits the set command SET_CMD to the cellular telephone 200. Then, the cellular telephone 200 updates the received data to maintain the same data as that of the PDA 100.

As described above, the radio multi-terminal communications system of the invention prioritizes the messages transmitted between the cellular telephone and the PDA, and processes the messages according to the priority order. In this manner, the system can provide the real time data service with reduced data processing time, which may contribute to the reduction in the battery consumption.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A data synchronizing method for a radio multi-terminal communications system including a cellular telephone and a PDA (Personal Data Assistant), said method comprising the steps of:

prioritizing messages transmitted between the cellular telephone and the PDA, and setting command types of the messages;

analyzing priority types and the command types of the messages; and synchronizing data of the cellular telephone with data of the PDA according to the priority types, so as to allow the cellular telephone and the PDA to share the data.

2. The method as claimed in claim 1, wherein the step of prioritizing messages includes the step of prioritizing messages according to a priority type, the priority types including a first priority type assigned to a message to be shared immediately, a second priority type assigned to a message to be shared according to a user's decision, a third priority type assigned to a message to be shared according to the user's decision upon checking current states of the cellular telephone and the PDA.

3. The method as claimed in claim 1, wherein the step of setting command types of the messages includes the step of setting command types including a request command responsive to which the PDA requests the cellular telephone to transmit data to be shared, a response command responsive to which the cellular telephone transmits to the PDA a response to said request command, a set command responsive to which the PDA requests the cellular telephone to update the data, and an indication command responsive to which the cellular telephone requests the PDA to store the data.

4. The method as claimed in claim 1, wherein the step of synchronizing further includes the steps of:

determining if a request is received from one of the cellular telephones and the PDA to share data;

responding to the request by transmitting data to the requesting one of the cellular telephone and the PDA; and generating an indication command to authorize storing data.

5. The method as claimed in claim 4, further comprises the step of updating stored data in response to an indication command, the indication command providing authorization to store data.

6. The method as claimed in claim 1, further comprises the step of transmitting formatted messages between the cellular telephone and the PDA, the formatted messages including a priority type storage area.

7. The method as claimed in claim 1, wherein the formatted messages include a command type storage area.

8. A method for transmitting and receiving data in a radio multi-terminal communications system including a cellular telephone and a PDA, comprising the steps of:

upon detection of data with a first priority type generated from the cellular telephone, storing the data in the cellular telephone, and transmitting the data to the PDA to store therein so as to allow the PDA to share the data with the cellular telephone;

upon detection of data with a second priority type generated from the cellular telephone, determining whether the received data is requested by a user, transmitting, the data to the PDA when the received data is requested by the user, and storing the data in the PDA to allow the PDA to share the data with the cellular telephone; and upon detection of data with the second priority type generated from the PDA, transmitting the data to the cellular telephone and updating the data in the cellular telephone so as to allow the cellular telephone to share the data with the PDA.

9. The method as claimed in claim 8, wherein the step of transmitting data further comprises the step of transmitting command types along with the data, the command types including a request command responsive to which the PDA requests the cellular telephone to transmit data to be shared, a response command responsive to which the cellular telephone transmits to the PDA a response to said request command, a set command responsive to which the PDA requests the cellular telephone to update the data, and an indication command responsive to which the cellular telephone requests the PDA to store the data.

10. The method as claimed in claim 8, wherein transmitting data includes the step of transmitting formatted messages between the cellular telephone and the PDA, the formatted messages including a priority type storage area for transmitting a priority type for the data.

11. The method as claimed in claim 10, wherein the formatted messages include a command type storage area.

12. A radio multi-terminal communications system comprising:

a first cellular device, and a second cellular device having an interface capable of coupling therebetween;

the interface including a transceiver for transmitting and receiving two-way communications between the first cellular device and the second cellular device, the two-way communications including prioritized messages and command types of The messages transmitted between the first cellular device and the second cellular device, wherein the first cellular device and the second cellular device further including:

means for analyzing priority types and the command types of the messages; and means for synchronizing data of the first cellular device with data of the second cellular device according to the priority types, so as to allow the first cellular device and the second cellular device to share the data.

13. The system as recited in claim 12, wherein the transceiver includes a universal asynchronous receiver transmitter.

14. The system as recited in claim 12, wherein the prioritized messages are prioritized according to a priority type, the priority types including a first priority type assigned to a message to be shared immediately, a second priority type assigned to a message to be shared according to a user's decision, a third priority type assigned to a message to be shared according to the user's decision upon checking current states of the cellular devices.

15. The system as recited in claim 12, wherein the command types include a request command responsive to which the first cellular device requests the second cellular device to transmit data to be shared, a response command responsive to which the second cellular device transmits to the first cellular device a response to said request command, a set command responsive to which the first cellular device requests the second cellular device to update the data, and an indication command responsive to which the second cellular device requests the first cellular device to store the data.

16. The system as recited in claim 12, wherein the prioritized messages and command types are transmitted in a format, the format including a storage area for each of: priority type information, command type information, message type information, length of the message information and data to be transmitted.

17. The system as recited in claim 12, wherein the first cellular device and the second cellular device include a PDA and a cellular telephone.

* * * * *